(12) United States Patent
Noda et al.

(10) Patent No.: US 8,368,833 B2
(45) Date of Patent: Feb. 5, 2013

(54) LIQUID CRYSTAL DISPLAY INCLUDING SOURCE LINES DEFINING AN OPENING PORTION AND A DEFECT CORRECTING METHOD FOR THE SAME

(75) Inventors: Tomoki Noda, Tsu (JP); Toshihide Tsubata, Tsu (JP); Masanori Takeuchi, Tsu (JP); Kenji Enda, Katsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/229,868

(22) Filed: Sep. 12, 2011

(65) Prior Publication Data

US 2012/0236226 A1 Sep. 20, 2012

Related U.S. Application Data

(63) Continuation of application No. 13/018,815, filed on Feb. 1, 2011, now Pat. No. 8,035,768, which is a continuation of application No. 12/847,092, filed on Jul. 30, 2010, now Pat. No. 7,903,190, which is a continuation of application No. 11/721,538, filed as application No. PCT/JP2005/022840 on Dec. 13, 2005, now Pat. No. 7,777,825.

(30) Foreign Application Priority Data

Dec. 14, 2004 (JP) ................................. 2004-360654

(51) Int. Cl.
*G02F 1/1333* (2006.01)

(52) U.S. Cl. .......................................... 349/54; 349/90

(58) Field of Classification Search .................... 349/54, 349/90, 98
See application file for complete search history.

(56) References Cited

U.S. PATENT DOCUMENTS 8,035,768 B2 * 10/2011 Noda et al. ...................... 349/54

OTHER PUBLICATIONS

Noda et al.; "Liquid Crystal Display and a Defect Correcting Method for the Same"; U.S. Appl. No. 13/018,815, filed Feb. 1, 2011.
Noda et al.; "Liquid Crystal Display and a Defect Correcting Method for the Same"; U.S. Appl. No. 12/847,092, filed Jul. 30, 2010.
Noda et al.; "Liquid Crystal Display and a Defect Correcting Method for the Same"; U.S. Appl. No. 11/721,538, filed Jun. 13, 2007.

* cited by examiner

*Primary Examiner* — Akm Enayet Ullah
(74) *Attorney, Agent, or Firm* — Keating & Bennett, LLP

(57) ABSTRACT

A liquid crystal display uses a pixel division method by which the size of a defect can be reduced much more than conventionally possible, and a defect correcting method for the liquid crystal display. The liquid crystal display is provided with an active matrix array substrate including a plurality of gate lines and a plurality of source lines arranged on a transparent substrate to intersect with each other, and a plurality of pixel electrodes arranged in a matrix, each pixel electrode including an assembly of a plurality of sub-pixel electrodes, separate TFTs respectively connected to the sub-pixel electrodes in the vicinity of an intersection portion of the gate line and the source line, the TFTs being driven by the common gate line and the common source line, and at least one opening portion being formed in a lower-layer side line placed in a lower layer at the intersection portion.

20 Claims, 13 Drawing Sheets

LIQUID CRYSTAL DISPLAY INCLUDING SOURCE LINES DEFINING AN OPENING PORTION AND A DEFECT CORRECTING METHOD FOR THE SAME

BACKGROUND OF THE INVENTION

1. Field of the Invention

The present invention relates to a liquid crystal display and a defect correcting method for the same, and more specifically relates to a liquid crystal display adopting a pixel division method and a defect correcting method for the same.

2. Description of the Related Art

A liquid crystal display has excellent characteristics such as high definition, thinness, lightness and low power consumption. Thus, recently, the liquid crystal display is rapidly expanding its market in accordance with an improvement in production capacity, an improvement in price competition with other displays, and the like.

For this kind of liquid crystal display, Japanese Patent Application Unexamined Publication No. 2004-78157, for example, discloses a liquid crystal display provided with an active matrix array substrate adopting a pixel division method in which each pixel electrode includes an assembly of a plurality of sub-pixel electrodes.

FIG. 13 is a schematic diagram showing a pixel electrode formed on an active matrix array substrate provided in a conventional liquid crystal display. Specifically, as shown in FIG. 13, a pixel electrode 101 on an active matrix array substrate 100 is split into sub-pixel electrodes 103a and 103b interposing a gate line 102 therebetween. In the vicinity of an intersection portion 105 of the gate line 102 and a source line 104, separate thin film transistors (TFTs) 106a and 106b which are driven by the common gate line 102 and the common source line 104 are provided, and the TFTs 106a and 106b are electrically connected to their corresponding sub-pixel electrodes 103a and 103b.

In the liquid crystal display provided with the above-mentioned active matrix array substrate 100, the common gate line 102 and the common source line 104 are used to drive the sub-pixel electrodes 103a and 103b via the separate TFTs 106a and 106b.

Therefore, for example, as shown in FIG. 14, when a leak 107a (hereinafter referred to as the "SG leak") is developed in the TFT 106a between the gate line 102 and the source line 104, and a correction for the SG leak 107a is performed using a correcting device such as a laser, it is necessary to cut the source line 104 at cut sections 108a and 108b to completely isolate the SG leak 107a from the source line 104. Consequently, even if the leak is developed only in the TFT 106a, the sub-pixel electrode 103b driven by the TFT 106b is unintentionally made defective.

In other words, there is a problem that even though the pixel division method in which each pixel electrode includes the assembly of the plurality of sub-pixel electrodes is adopted, a whole pixel unintentionally results in a defective pixel (for example, if the liquid crystal display uses a normally black mode, the defective pixel is observed as a full black dot of a whole pixel).

SUMMARY OF THE INVENTION

In order to overcome the problems described above, preferred embodiments of the present invention provide a liquid crystal display adopting a pixel division method by which the size of a defect can be made smaller than conventional, and also provide a defect correcting method for the liquid crystal display.

According to a preferred embodiment the present invention, a liquid crystal display is provided with an active matrix array substrate including a plurality of gate lines and a plurality of source lines disposed on a transparent substrate to intersect with each other, and a plurality of pixel electrodes arranged in a matrix, each of the pixel electrodes including an assembly of a plurality of sub-pixel electrodes, separate active elements respectively connected to the sub-pixel electrodes in the vicinity of an intersection portion of the gate line and the source line, the active elements being driven by the common gate line and the common source line, and at least one opening portion being formed in a lower-layer side line placed in a lower layer at the intersection portion of the gate line and the source line.

In the above liquid crystal display, it is preferable that the lower-layer side line is the gate line, and an upper-layer side line which is placed in an upper layer of the lower-layer side line is the source line.

In addition, in the above liquid crystal display, it is preferable that an additional source line being partially connected to and extending along the source line is further included, or that a bypass line being connected to the source line at the intersection portion is included.

In addition, in the above liquid crystal display, it is preferable that the opening portion does not include an electrode layer and/or a semiconductor layer.

On the other hand, a defect correcting method for a liquid crystal display according to another preferred embodiment of the present invention is a defect correcting method for the above liquid crystal display, and includes at least the steps of cutting the upper-layer side line passing above the opening portion, and cutting a line including a defective section in the cut line so as to disconnect the defective section.

The liquid crystal display as mentioned above is provided with the active matrix array substrate in which the separate active elements, which are driven by the common gate line and the common source line, are respectively connected to their corresponding sub-pixel electrodes in the vicinity of the intersection portion of the gate line and the source line, and the opening portion is formed in the lower-layer side line at the intersection portion of the gate line and the source line.

Therefore, when a defect is developed in any one of the active elements and the like, the upper-layer side line passing above the opening portion can be easily cut by using a correcting mechanism such as a laser. If a line including the defective section in the cut line is cut, the defective section can be completely isolated from the line.

If correction using an auxiliary line and the like are made as necessary thereafter, the defect can be observed as a defective pixel of a sub-pixel, not as a defective pixel of a whole pixel. Thus, the size of the defective pixel is made smaller than conventional, leading to no defects. Consequently, when the active matrix array substrate is used especially in a comparatively large liquid crystal display and the like, advantages achieved include an improvement in display quality due to the reduction of the number of defects, an improvement in production efficiency (yields), and the like.

When the additional source line being partially connected to and extending along the source line is further included, the advantages described above can be obtained without making the correction using the auxiliary line. Therefore, there is an advantage that hours of work required for defect correction can be reduced to further improve the production efficiency of the liquid crystal display.

In addition, when the bypass line is connected to the source line in the intersection portion, an aperture area per pixel can be widely assured while maintaining certain redundancy as mentioned above. Therefore, advantages including an improvement in display quality in accordance with an improvement in display luminance, cost reduction or reduction in power consumption of a backlight in accordance with an improvement in luminance efficiency, and the like, are achieved.

In addition, when the opening portion does not include the electrode layer and/or the semiconductor layer, there are advantages that a leak by the electrode layer and a cut piece produced during the line cutting by using the correcting mechanism such as the laser is not developed, and correction can be easily made.

On the other hand, according to the defect correcting method for the liquid crystal display according to another preferred embodiment of the present invention, by cutting the upper-layer side line passing above the opening portion, a judgment on whether the defective section is present in a line on an input-end side of the cut section or in a line on an open-end side of the cut section can be easily made through image display after the line cutting, and the defective section can be isolated from the line by cutting the line including the defective section.

Therefore, the defective section, which is conventionally hard to detect by a microscopic observation and the like, can be easily detected. Thus, the defect correcting method has an advantage of allowing for reliable correction.

Other features, elements, steps, characteristics and advantages of the present invention will become more apparent from the following detailed description of preferred embodiments with reference to the attached drawings.

DETAILED DESCRIPTION OF PREFERRED EMBODIMENTS

A detailed description of a liquid crystal display and a defect correcting method for the same according to preferred embodiments of the present invention will now be given.

In principle, the liquid crystal display according to preferred embodiments of the present invention is a device in which at least a driving circuit which controls alignment of liquid crystals based on an external signal is attached to a liquid crystal panel in which the liquid crystals are sealed in between an active matrix array substrate having at least a plurality of pixel electrodes and a plurality of active elements on a transparent substrate and a substrate having at least a common electrode for the plurality of pixel electrodes on a transparent common substrate opposed to the transparent substrate, where information can be displayed by conducting optical modulation.

The liquid crystal display is characterized in that the active matrix array substrate has a new structure. Accordingly, the structure of the active matrix array substrate provided in the liquid crystal display according to the preferred embodiments of the present invention will be mainly described hereinafter.

On the other hand, the defect correcting method for the liquid crystal display according to a preferred embodiment of the present invention is a method for correcting a defect by utilizing the new structure of the active matrix array substrate provided in the liquid crystal display according to a preferred embodiment of the present invention. Therefore, the defect correcting method will be described with respect to each of liquid crystal displays according to preferred embodiments of the present invention.

First Preferred Embodiment

Figure 1:
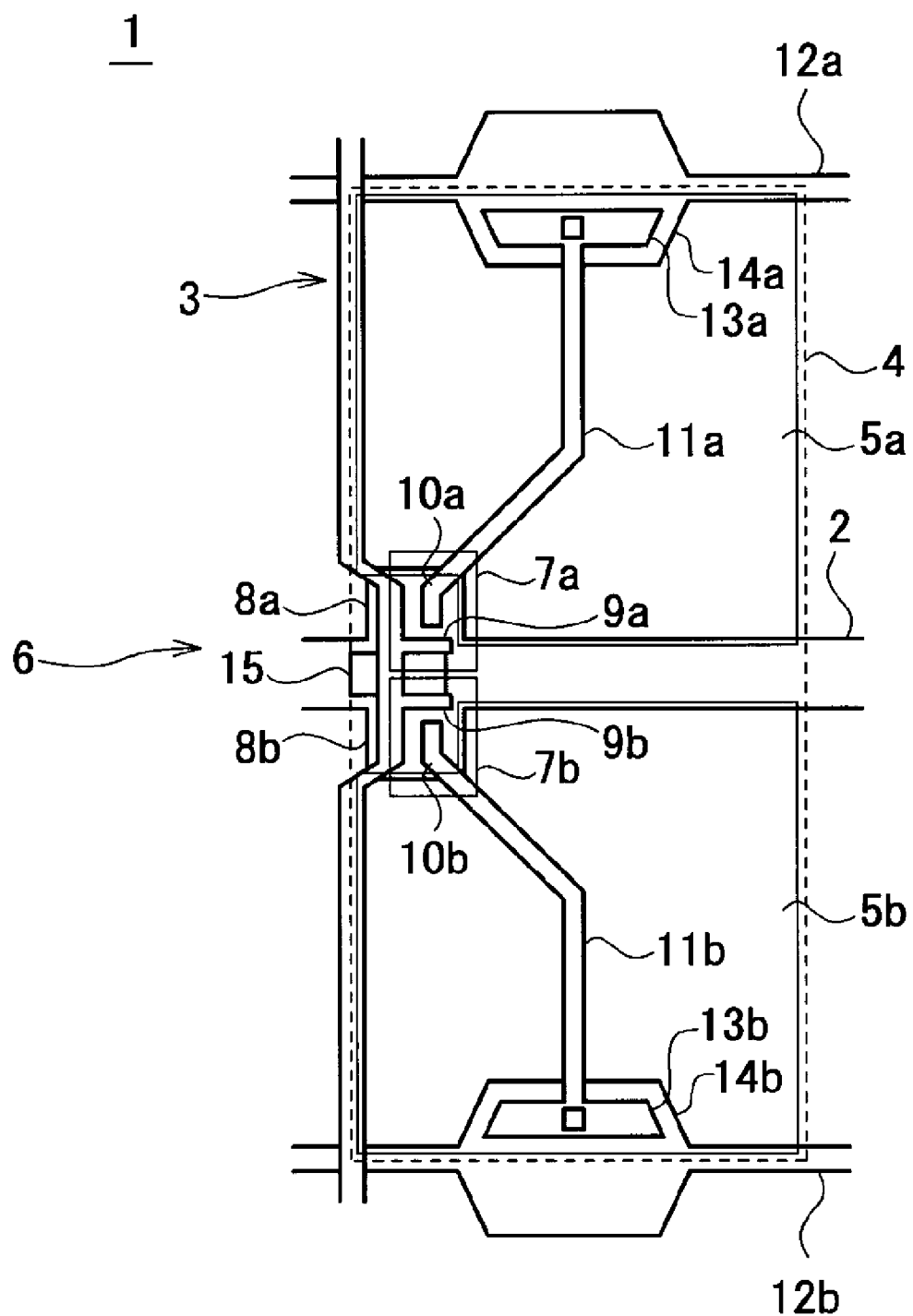
FIG. 1 is a schematic diagram showing a pixel electrode formed on an active matrix array substrate provided in a liquid crystal display according to a first preferred embodiment of the present invention.

FIG. 1 is a schematic diagram showing a pixel electrode formed on an active matrix array substrate provided in a liquid crystal display according to a first preferred embodiment of the present invention.

On a transparent substrate (unillustrated) constituting the active matrix array substrate 1, a plurality of gate lines 2 extending in a row direction are formed, and a plurality of source lines 3 extending in a column direction are formed while intersecting at right angles with the gate lines 2 via an insulating layer (unillustrated). Incidentally, the gate line 2 shown in FIG. 1 is the $n^{th}$ one, and the source line 3 shown in FIG. 1 is the $m^{th}$ one. In addition, the gate line 2 is a lower-layer side line, and the source line 3 is an upper-layer side line.

A pixel electrode 4 is split into two sub-pixel electrodes 5a and 5b interposing the gate line 2 therebetween. In the vicinity of an intersection portion 6 of the gate line 2 and the source line 3, separate thin film transistors (TFTs) 7a and 7b which are respectively connected to the sub-pixel electrodes 5a and 5b are provided.

The TFTs 7a and 7b are on/off controlled by a scanning signal voltage provided by gate electrodes 8a and 8b connected to the common gate line 2. In addition, a display signal voltage provided by source electrodes 9a and 9b connected to the common source line 3 is provided to the sub-pixel electrodes 5a and 5b via drain lines 11a and 11b extending from drain electrodes 10a and 10b.

In the drain lines 11a and 11b, portions opposed to auxiliary capacitance lines 12a and 12b, which are placed parallel to the gate line 2, via the insulating layer (unillustrated) function as auxiliary capacitance electrodes 13a and 13b. In addition, in the auxiliary capacitance lines 12a and 12b, portions opposed to the auxiliary capacitance electrode 13a and 13b via the insulating layer function as auxiliary capacitance common electrodes 14a and 14b.

At the intersection portion 6 of the gate line 2 and the source line 3, at least one opening portion 15 is formed in the gate line 2 being the lower-layer side line. Here, it is preferable that the opening portion 15 does not include an electrode layer and/or a semiconductor layer and the like. In other words, it is preferable that the opening portion 15 does not include constituent elements other than the upper-layer side line.

If the opening portion 15 does not include the electrode layer and/or the semiconductor layer, a leak and the like by a cut piece and the electrode layer are hard to be developed at the time of cutting a line using a correcting mechanism such as a laser, and correction can be easily made. Specific examples of the electrode layer and the semiconductor layer include ITO, an $n^+/i$ layer and the like for the upper layer.

Figure 2A:
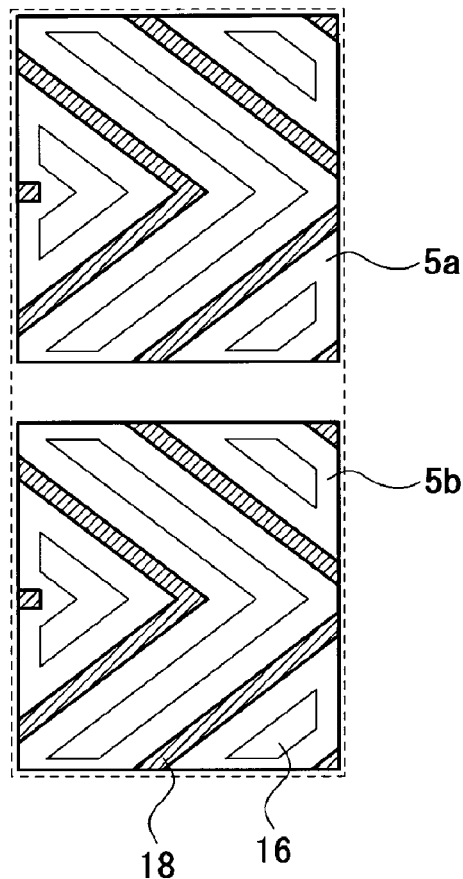
FIGS. 2A and 2B are schematic diagrams showing a placement relationship between slits formed in the pixel electrode (sub-pixel electrodes) and ribs formed on a common electrode in the liquid crystal display according to the first preferred embodiment (in a multi-domain vertical alignment (MVA) mode).
Figure 2B:
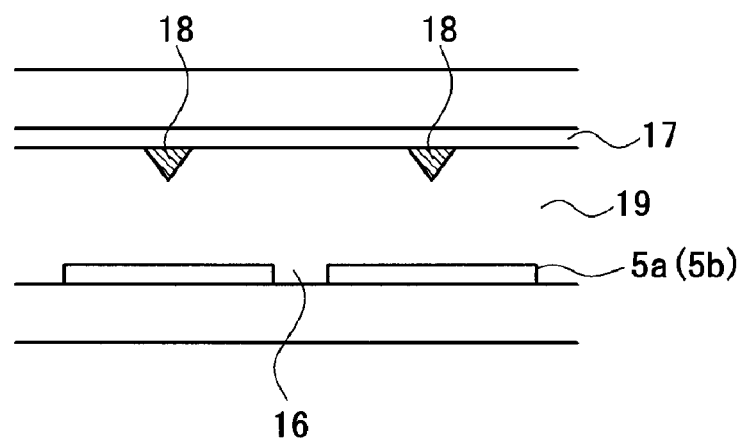

In the liquid crystal display according to the first preferred embodiment (also in the other preferred embodiments to be described later), it is preferable that slits 16 (portions which do not include the electrode layer) are formed in the sub-pixel electrodes 5a and 5b, and ribs 18 are formed on the common electrode 17, as schematically shown in FIGS. 2A and 2B, and nematic liquid crystals having negative dielectric anisotropy are used as liquid crystals 19. This is because liquid crystal molecules are aligned in multiple directions by the action of the slits 16 and the ribs 18 at the time of application of an electric field, so that a favorable wide viewing angle can be obtained.

Next, a defect correcting method for the liquid crystal display according to the first preferred embodiment will be described referring to FIGS. 3A to 8B.

Figure 3A:
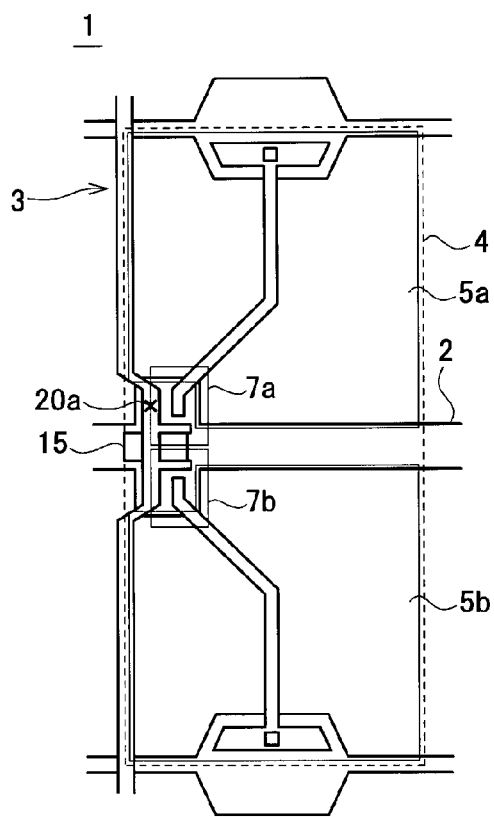
FIGS. 3A and 3B are views showing positions of an SG leak which is developed in thin film transistors (TFTs) on the active matrix array substrate provided in the liquid crystal display according to the first preferred embodiment of the present invention.
Figure 3B:
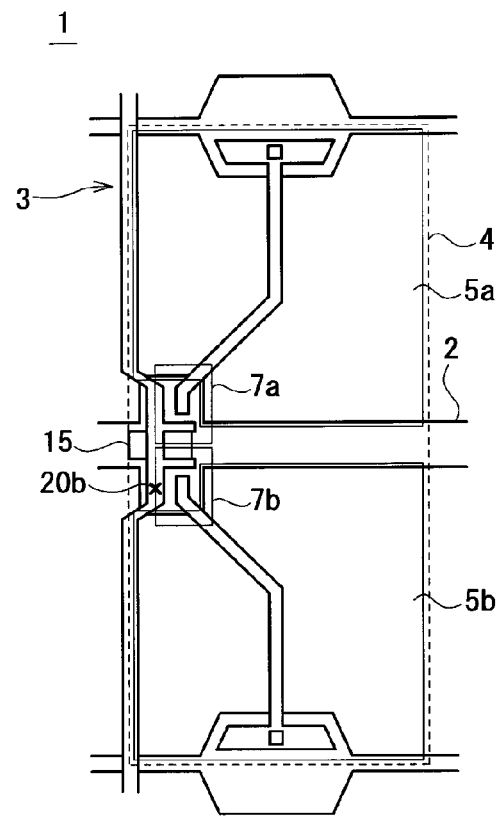
Figure 4:
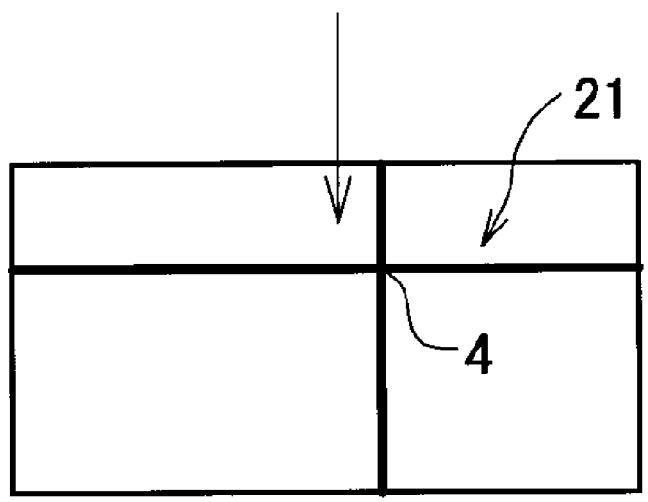
FIG. 4 is a schematic diagram showing an image observed from a transparent substrate side of the active matrix array substrate when the SG leak shown in FIG. 3 is developed.

When an SG leak 20a in the TFT 7a or an SG leak 20b in the TFT 7b is developed between the gate line 2 and the source line 3 as shown in FIGS. 3A and 3B, observation by lighting of a liquid crystal panel shows that a cross defect 21 having an intersection point at the pixel electrode 4 is developed in an image viewed from the transparent substrate side of the active matrix array substrate 1, as shown in FIG. 4. Incidentally, at this point in time, it is uncertain which of the SG leak 20a in the TFT 7a or the SG leak 20b in the TFT 7b is developed. In other words, it is uncertain which of a state in FIG. 3A or a state in FIG. 3B is brought about.

Figure 5A:
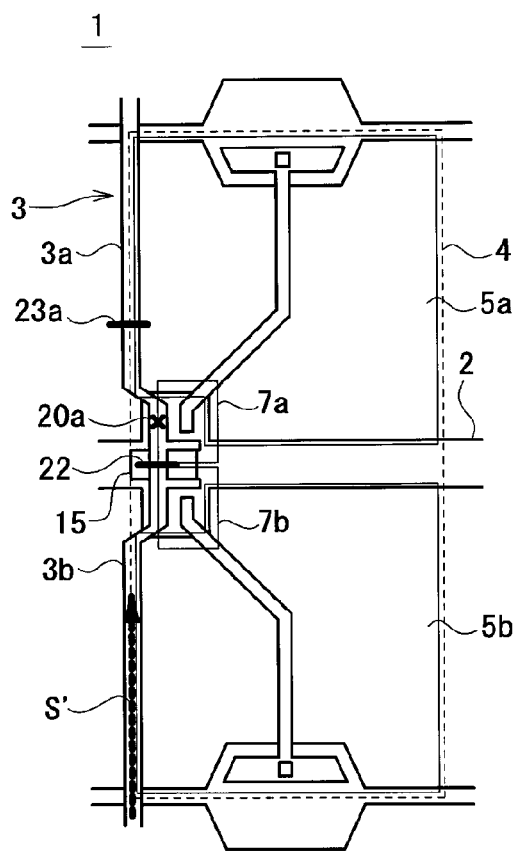
FIGS. 5A and 5B are views for explaining steps for making correction using an auxiliary line by cutting a source line above an opening portion, and then cutting a source line on an input side or a source line on a non-input side to isolate the SG leak.
Figure 5B:
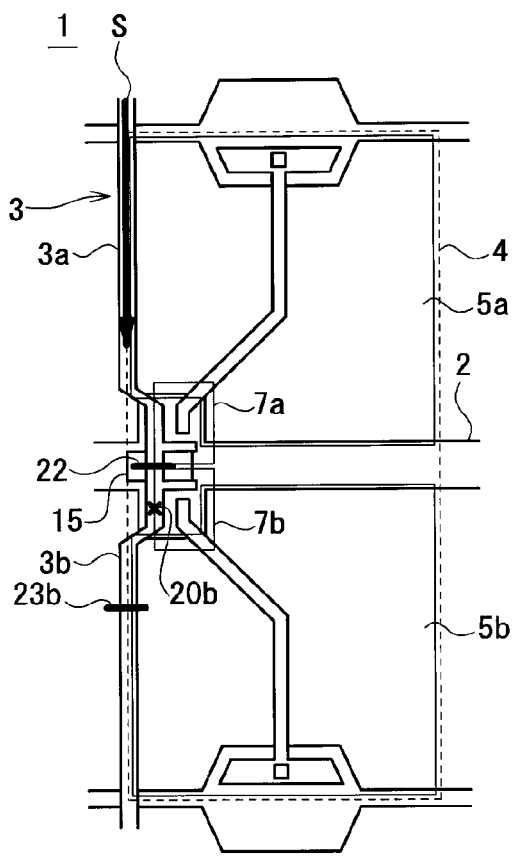

Then, as shown in FIGS. 5A and 5B, the source line 3 being the upper-layer side line passing above the opening portion 15 is cut at a cut section 22 from the transparent substrate side by using the correcting mechanism such as the laser, and the observation by lighting of the liquid crystal panel is made again.

Figure 6A:
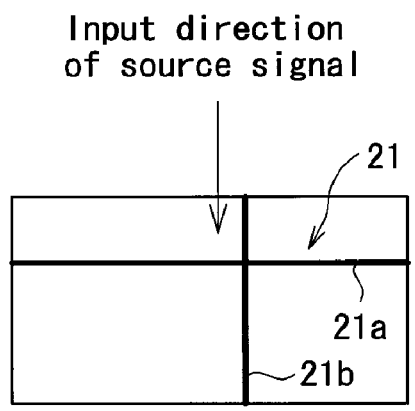
FIGS. 6A and 6B are schematic diagrams showing images observed from the transparent substrate side of the active matrix array substrate when the source line above the opening portion is cut.
Figure 6B:
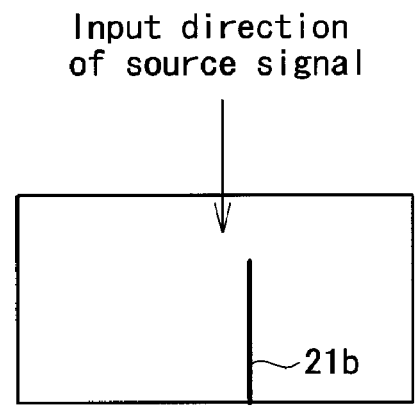

In the observation, if the SG leak 20a in the TFT 7a on an input-end side (hereinafter referred to as the "input side") of the cut section 22 of the source line 3 is developed as shown in FIG. 5A, the cross defect 21 is still observed as shown in FIG. 6A. On the other hand, if the SG leak 20b in the TFT 7b on an open-end side (hereinafter referred to as the "non-input side") of the cut section 22 of the source line 3 is developed as shown in FIG. 5B, a line defect 21a in the direction of the gate line 2 disappears and a line defect 21b in the direction of the source line 3 is observed as shown in FIG. 6B.

Shortly, by cutting the source line 3 passing above the opening portion 15 at the cut section 22, a judgment on which of the SG leak 20a in the TFT 7a or the SG leak 20b in the TFT 7b is developed is facilitated. Accordingly, it becomes possible to judge which part of the cut line (a source line 3a on the input side or a source line 3b on the non-input side) is to be cut in the subsequent step.

Figure 7A:
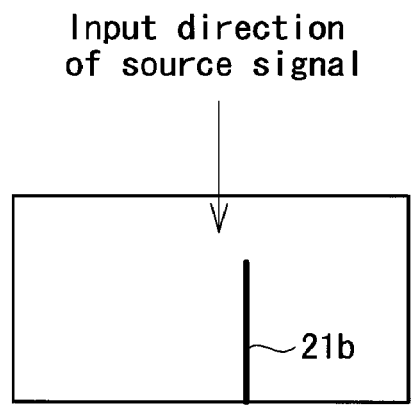
FIGS. 7A and 7B are schematic diagrams showing images observed from the transparent substrate side of the active matrix array substrate when the source line on the input side or the source line of the non-input side is cut to isolate the SG leak.

Then, if the SG leak 20a in the TFT 7a is developed as shown in FIG. 5A, the source line 3a on the input side is cut at a cut section 23a to completely isolate the SG leak 20a from the source line 3. In this case, in the image of the observation by lighting, the line defect 21a in the direction of the gate line 2 disappears, and the line defect 21b in the direction of the source line 3 is observed, as shown in FIG. 7A.

Figure 7B:
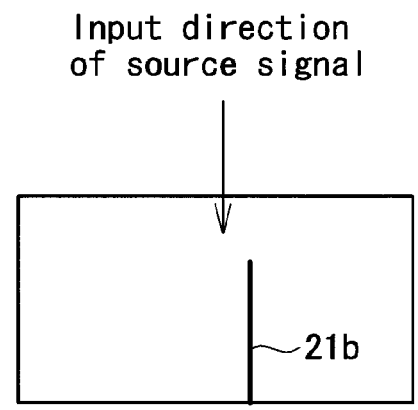

On the other hand, if the SG leak 20b in the TFT 7b is developed as shown in FIG. 5B, the source line 3b on the non-input side is cut at a cut section 23b to completely isolate the SG leak 20b from the source line 3. In this case, in the image of the observation by lighting, the line defect 21b in the direction of the source line 3 is still observed as shown in FIG. 7B.

Next, in a case where the SG leak 20a in the TFT 7a is developed as shown in FIG. 5A, by making correction using an auxiliary line (a redundancy line) (unillustrated) and inputting a source signal S' via the auxiliary line from the source line 3b on the non-input side to the TFT 7b, a sub-pixel (the sub-pixel electrode 5b) can be driven. On the other hand, in a case where the SG leak 20b in the TFT 7b is developed as shown in FIG. 5B, by performing the correction using the auxiliary line and inputting the source signal S' (unillustrated) from the source line 3b on the non-input side, sub-pixels (pixels) (unillustrated) arranged on the non-input side of the sub-pixel (the sub-pixel electrode 5b) can be driven.

Figure 8A:
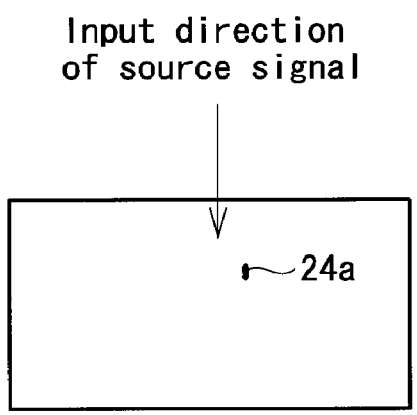
FIGS. 8A and 8B are schematic diagrams showing images observed from the transparent substrate side of the active matrix array substrate when the correction using the auxiliary line is made.
Figure 8B:
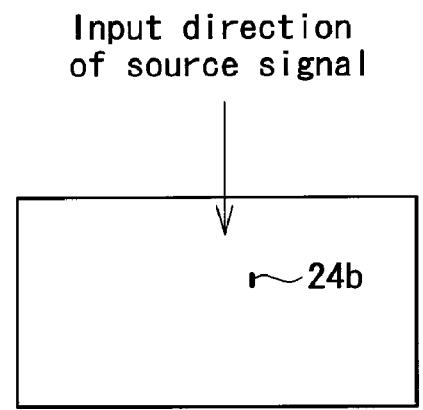

Therefore, for example, if the liquid crystal display according to the first preferred embodiment uses a normally black mode, the defective pixel is observed as not a full black dot of a whole pixel but a half black dot 24a or 24b of a sub-pixel as shown in FIGS. 8A and 8B. In addition, for example, if the liquid crystal display according to the first preferred embodiment uses a normally white mode, the defective pixel is observed as a half bright dot of a sub-pixel, and by performing processing such as forming it into a black dot, the defective pixel is observed as a half black dot 24a or 24b of a sub-pixel. In either case, the size of the defective pixel is made smaller than conventional, leading to a state of no defect (a normal level in view of display quality can be attained), so that quality of the liquid crystal display is improved.

For the correction using the auxiliary line, a known method can be used (see, for example, Japanese Patent Application Unexamined Publication Nos. Hei5-203986 and Hei9-146121).

Specifically, an auxiliary line (unillustrated) is placed in a peripheral portion of a display region on the active matrix array substrate 1 so as to extend completely around or extend half-way around the display region, and an input end and an open end of the source line 3 are short-circuited by the auxiliary line.

Second Preferred Embodiment

Figure 9:
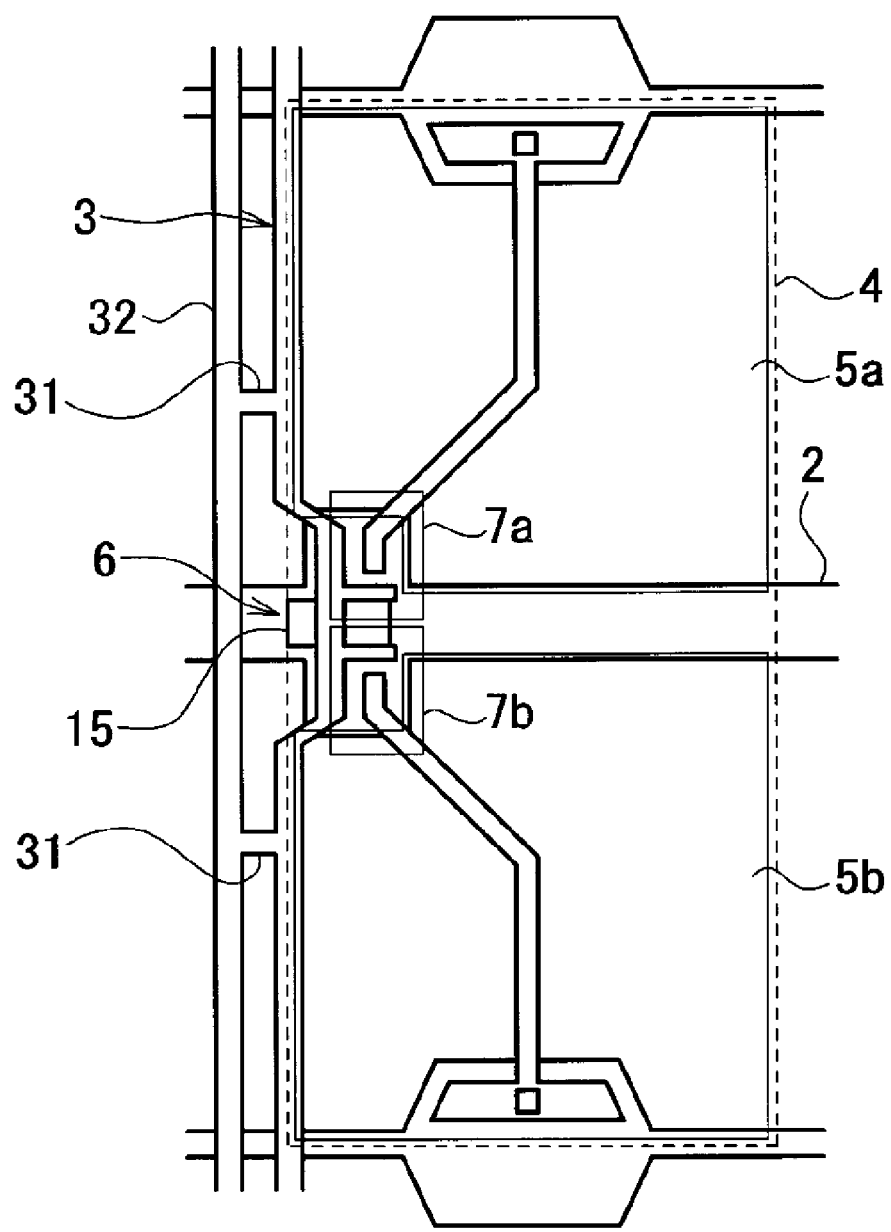
FIG. 9 is a schematic diagram showing a pixel electrode formed on an active matrix array substrate provided in a liquid crystal display according to a second preferred embodiment of the present invention.

FIG. 9 is a schematic view showing a pixel electrode formed on an active matrix array substrate provided in a liquid crystal display according to a second preferred embodiment of the present invention.

The structure of the active matrix array substrate 30 provided in the liquid crystal display according to the second preferred embodiment is basically the same as the structure of the active matrix array substrate 1 provided in the liquid crystal display according to the first preferred embodiment except for the source line 3. Therefore, differences from the liquid crystal display and the defect correcting method for the same according to the first preferred embodiment will be mainly described hereinafter.

As shown in FIG. 9, in the active matrix array substrate 30 provided in the liquid crystal display according to the second preferred embodiment, an additional source line 32 is further included while being partially connected to the source line 3 via connecting portions 31 and extending along the source line 3.

Figure 10A:
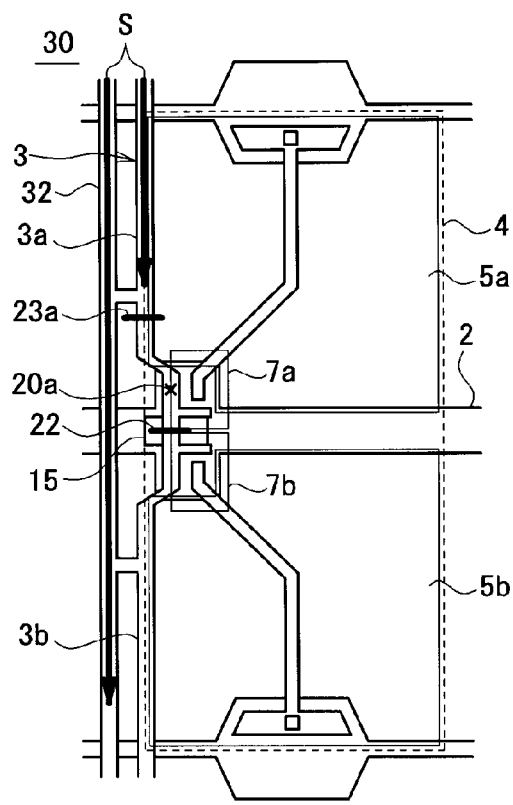
FIGS. 10A and 10B are views for explaining steps of cutting a source line above an opening portion, and then cutting a source line on an input side or a source line on a non-input side to isolate an SG leak in the liquid crystal display according to the second preferred embodiment of the present invention.
Figure 10B:
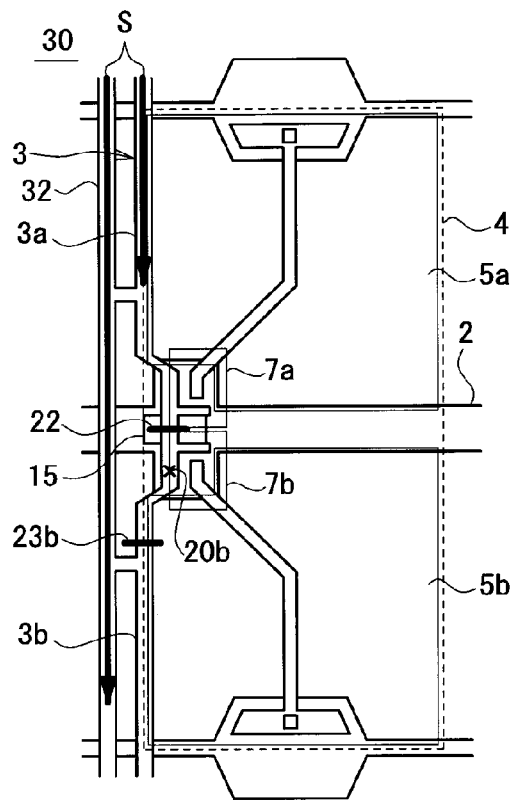

In the liquid crystal display according to the second preferred embodiment as mentioned above, when the SG leak 20a in the TFT 7a or the SG leak 20b in the TFT 7b is developed as shown in FIGS. 10A and 10B, similarly to the first preferred embodiment, the source line 3 being the upper-layer side line passing above the opening portion 15 is cut at the cut section 22 from the transparent substrate side by using the correcting mechanism such as the laser for correcting the SG leak 20a or the SG leak 20b.

Accordingly, a judgment on which of the SG leak 20a in the TFT 7a or the SG leak 20b in the TFT 7b is developed can be easily made based on an image viewed from the transparent substrate side. Then, if the SG leak 20a in the TFT 7a is developed as shown in FIG. 10A, the source line 3a on the input side is cut at the cut section 23a to completely isolate the SG leak 20a from the source line 3.

Here, as the active matrix array substrate 30 provided in the liquid crystal display according to the second preferred embodiment has the additional source line 32, a source signal S from the input side is inputted to the TFT 7b via the additional source line 32. Accordingly, the sub-pixel (the sub-pixel electrode 5b) can be driven without making the correction using the auxiliary line.

On the other hand, if the SG leak 20b in the TFT 7b is developed as shown in FIG. 10B, the source line 3b on the non-input side is cut to completely isolate the SG leak 20b from the source line 3.

Accordingly, the source signal S from the input side is supplied also to the non-input side via the additional source line 32. Thus, the sub-pixels (pixels) placed on the non-input side of the sub-pixel (the sub-pixel electrode 5b) can be driven without making the correction using the auxiliary line.

Consequently, also owing to the liquid crystal display according to the second preferred embodiment, the defect can be observed as a defective pixel of a sub-pixel, not as a defective pixel of a whole pixel, and the size of the defective pixel is made smaller than conventional, leading to no defects.

In addition, in the liquid crystal display according to the second preferred embodiment, there is no need to make the correction using the auxiliary line. As a result, hours of work required for defect correction can be reduced to improve production efficiency of the liquid crystal display. Further, delay of the source signal due to the correction using the auxiliary line and the like in the case of a large liquid crystal display can be avoided.

Third Preferred Embodiment

Figure 11:
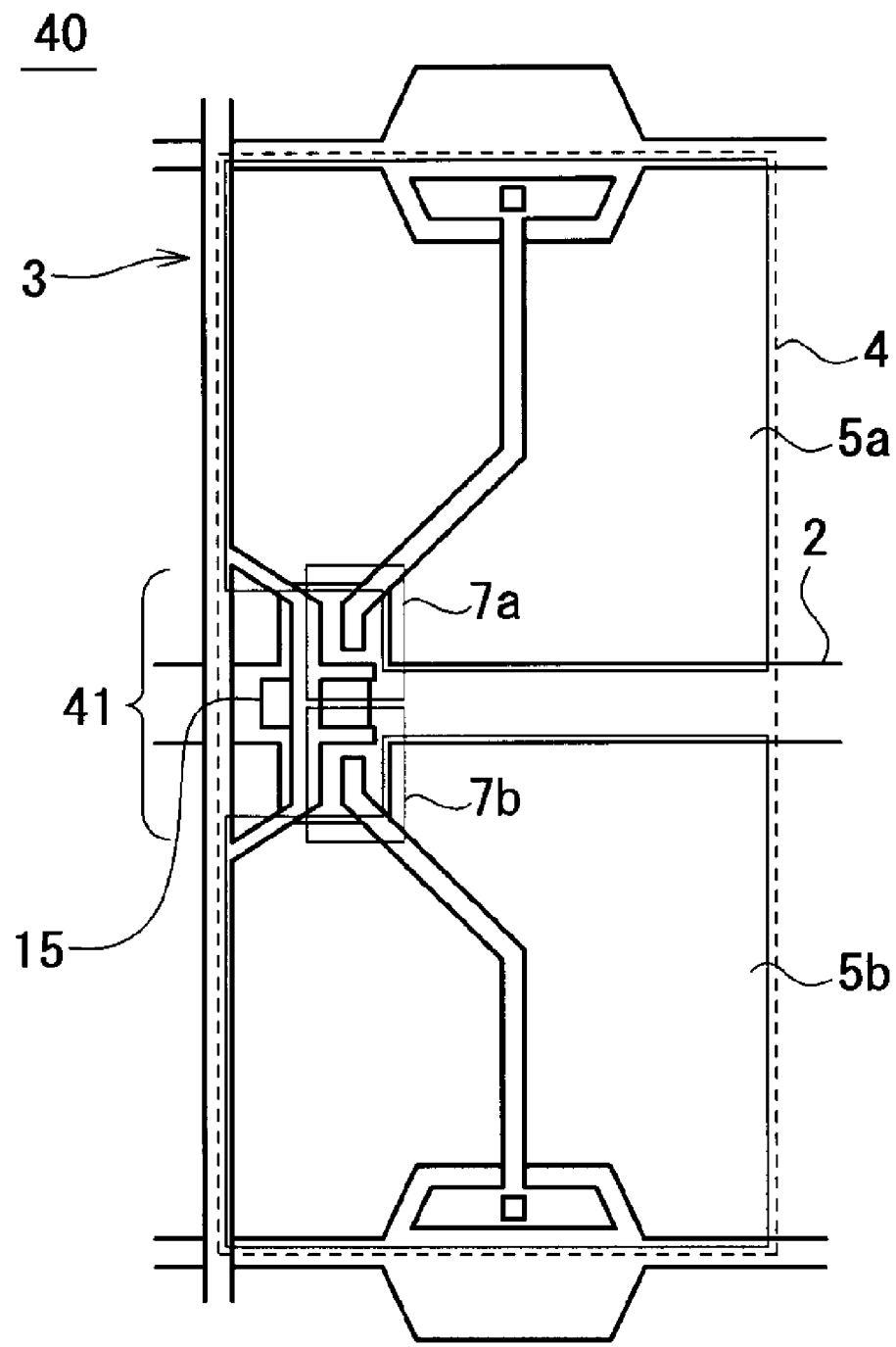
FIG. 11 is a schematic view showing a pixel electrode formed on an active matrix array substrate provided in a liquid crystal display according to a third preferred embodiment of the present invention.

FIG. 11 is a schematic diagram showing a pixel electrode formed on an active matrix array substrate provided in a liquid crystal display according to the third preferred embodiment.

The structure of the active matrix array substrate 40 provided in the liquid crystal display according to the third preferred embodiment is also basically the same as the structure of the active matrix array substrate 1 provided in the liquid crystal display according to the first preferred embodiment except for the source line 3. Therefore, differences from the liquid crystal display and the defect correcting method for the same according to the first preferred embodiment will be mainly described hereinafter.

As shown in FIG. 11, in the active matrix array substrate 40 provided in the liquid crystal display according to the third preferred embodiment, a bypass line 41 is included in the vicinity of the opening portion 15 of the source line 3. In this preferred embodiment, an example of this preferred embodiment where the bypass line 41 does not pass above the opening portion 15 is illustrated. However, the bypass line 41 may pass above the opening portion 15.

Figures 12A, 12B:
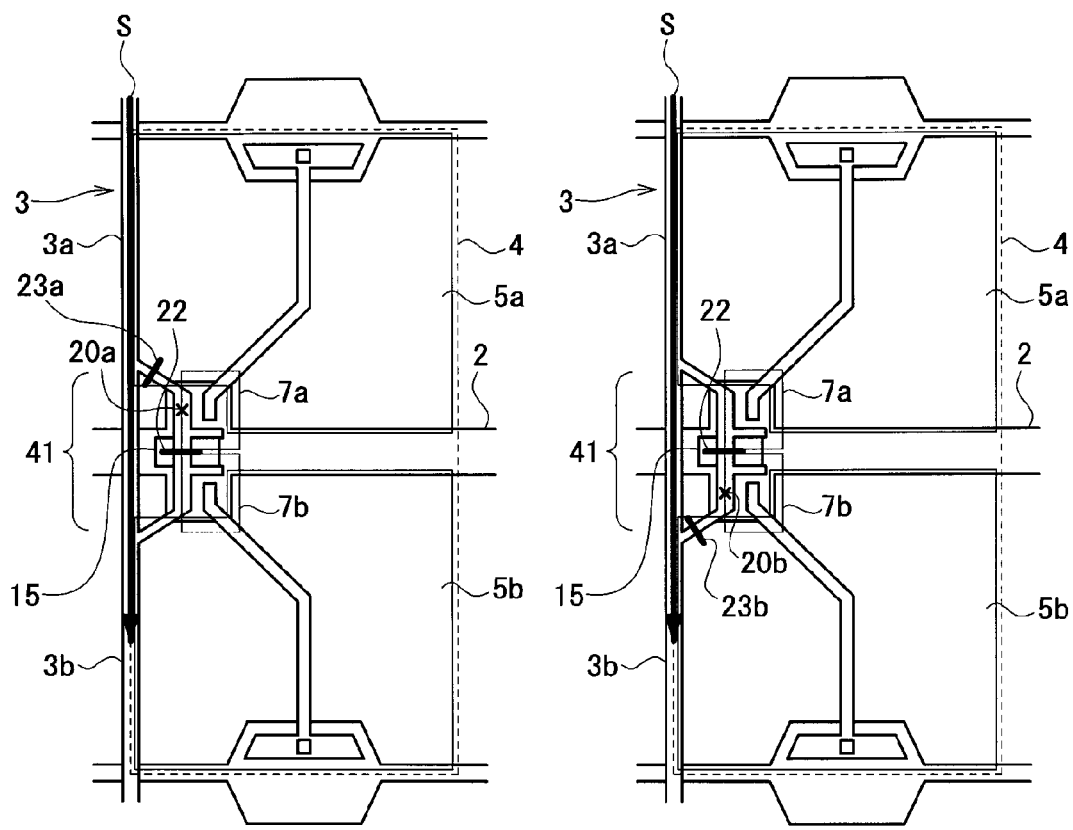
FIGS. 12A and 12B are views for explaining steps of cutting a source line above an opening portion, and then cutting a source line on an input side or a source line on a non-input side to isolate an SG leak in the liquid crystal display according to the third preferred embodiment of the present invention.
Figure 13:
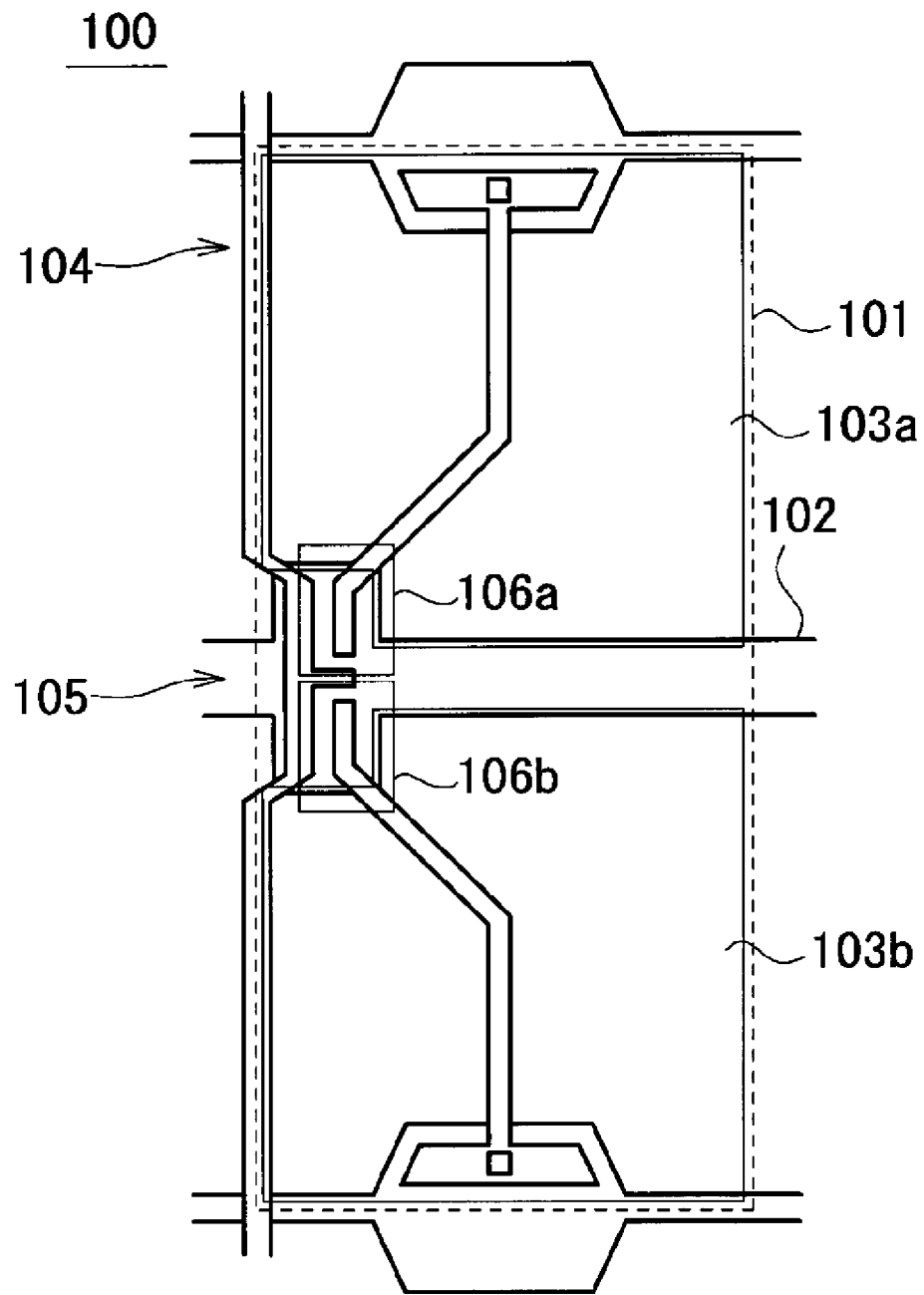
FIG. 13 is a schematic diagram showing an electrode substrate formed on an active matrix array substrate provided in a conventional liquid crystal display.
Figure 14:
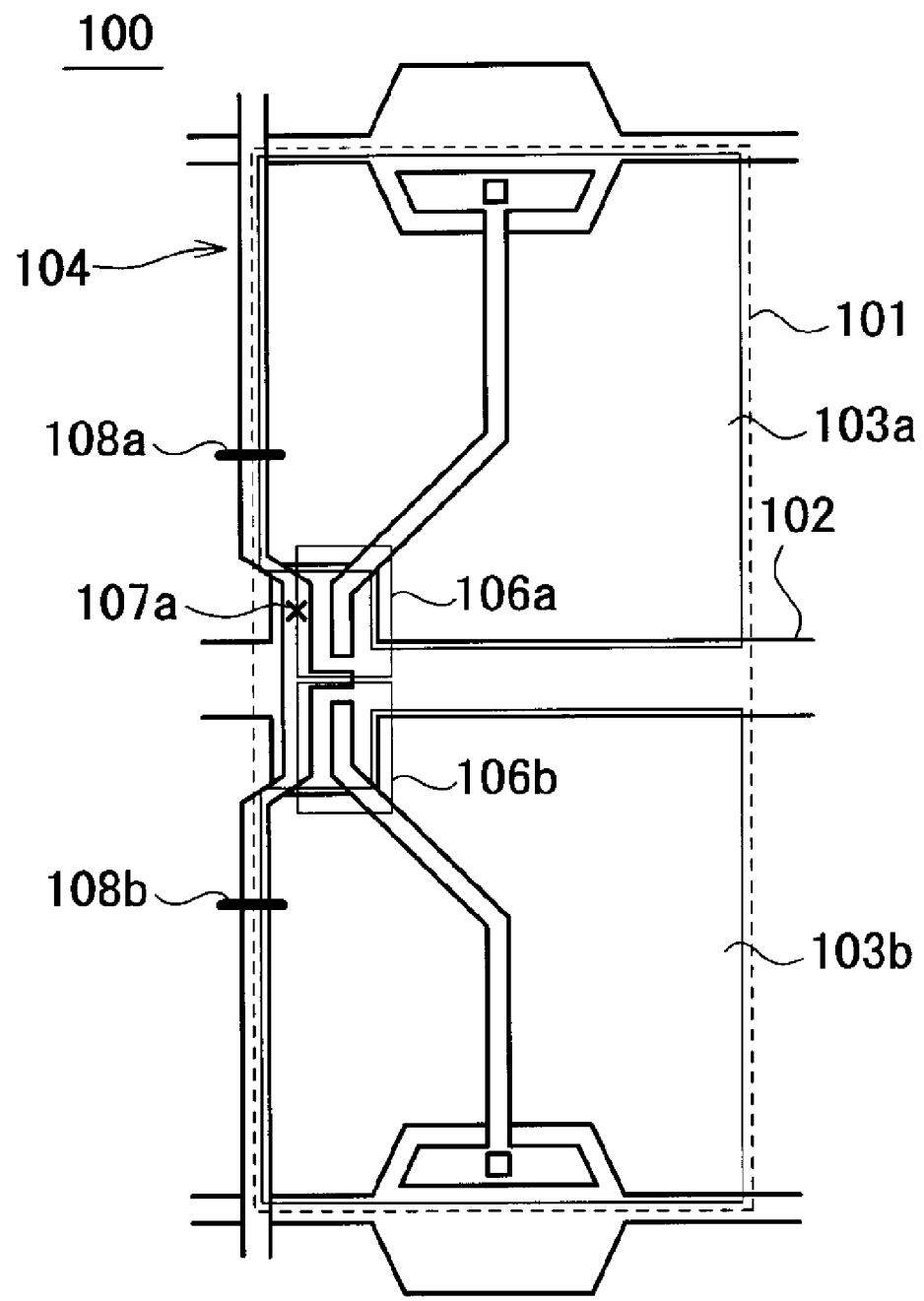
FIG. 14 is a view for explaining a defect correcting method when an SG leak is developed in any one of TFTs in the conventional liquid crystal display.

In the liquid crystal display according to the third preferred embodiment as mentioned above, when the SG leak 20a in the TFT 7a or the SG leak 20b in the TFT 7b is developed as shown in FIGS. 12A and 12B, similarly to the first and second preferred embodiments, the source line 3 being the upper-layer side line passing above the opening portion 15 is cut at the cut section 22 from the transparent substrate side by using the correcting mechanism such as the laser for correcting the SG leak 20a or the SG leak 20b.

Accordingly, a judgment on which of the SG leak 20a in the TFT 7a or the SG leak 20b in the TFT 7b is developed can be easily made based on an image viewed from the transparent substrate side. Thereafter, if the SG leak 20a in the TFT 7a is developed as shown in FIG. 12A, the source line 3a on the input side is cut at the cut section 23a to completely isolate the SG leak 20a from the source line 3.

Here, as the active matrix array substrate 40 provided in the liquid crystal display according to the third preferred embodiment has the bypass line 41, the source signal S from the input side is inputted to the TFT 7b via the bypass line 41. Accordingly, the sub-pixel (the sub-pixel electrode 5b) can be driven without making the correction using the auxiliary line.

On the other hand, if the SG leak 20b in the TFT 7b is developed as shown in FIG. 12B, the source line 3b on the non-input side is cut to completely isolate the SG leak 20b from the source line 3.

Thus, the source signal S from the input side is supplied also to the non-input side via the bypass line 41. Accordingly, the sub-pixels (pixels) placed on the non-input side of the sub-pixel (the sub-pixel electrode 5b) can be driven without making the correction using the auxiliary line.

Consequently, also according to the liquid crystal display according to the third preferred embodiment, the defect can be observed as a defective pixel of a sub-pixel, not as a defective pixel of a whole pixel, and the size of the defective pixel is made smaller than conventional, leading to no defects. In addition, the liquid crystal display according to the third preferred embodiment has equal redundancy to the liquid crystal display according to the second preferred embodiment.

Further, in the liquid crystal display according to the third preferred embodiment, an aperture area per pixel can be widely assured, which enables an improvement in display quality in accordance with an improvement in display luminance, cost reduction or reduction in power consumption of a backlight in accordance with an improvement in luminance efficiency, and the like.

The foregoing descriptions of the preferred embodiments of the present invention are not intended to be exhaustive or to limit the present invention to the precise form disclosed, and modifications and variations are possible in the light of the above teachings or may be acquired from practice of the present invention.

While the descriptions have been made to cases where each of the pixel electrodes includes the assembly of two sub-pixel electrodes in the above-described preferred embodiments, it is also preferable that each of the pixel electrodes includes an assembly of three or more sub-pixel electrodes.

In addition, while the descriptions have been made with reference to examples of preferred embodiments where the gate line is the lower-layer side line and the source line is the upper-layer side line, it is also preferable that the gate line is the upper-layer side line and the source line is the lower-layer side line.

Incidentally, while the descriptions have been made of examples of preferred embodiments where the TFTs are preferably used as the active elements, any elements which function as a switching element such as a metal insulator metal (MIM) may be used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A liquid crystal display provided with an active matrix array substrate, the active matrix array substrate comprising:
    a plurality of gate lines extending in a first direction and a plurality of source lines extending in a second direction that is different from the first direction, the plurality of gate lines and the plurality of source lines being arranged on a transparent substrate so as to intersect with each other at a plurality of intersection portions;
    a plurality of pixel electrodes arranged in a matrix; and
    at least one of the plurality of source lines includes at least one loop arranged to define an opening portion located at or adjacent to one of the plurality of intersection portions; wherein
    at least one portion of at least one of the plurality of gate lines is located within the opening portion and extends in the first direction; and
    at least one portion of a source electrode extends out from the at least one loop to overlap with another portion of the at least one of the plurality of gate lines.

2. The liquid crystal display according to claim 1, wherein the at least one loop includes only one loop defined in the at least one of the plurality of source lines.

3. The liquid crystal display according to claim 1, wherein the at least one loop includes a plurality of loops defined in the at least one of the plurality of source lines.

4. The liquid crystal display according to claim 1, wherein each of the plurality of source lines includes the at least one loop defined therein.

5. The liquid crystal display according to claim 4, wherein the at least one loop includes only one loop defined in each of the plurality of source lines.

6. The liquid crystal display according to claim 4, wherein the at least one loop includes a plurality of loops defined in each of the plurality of source lines.

7. The liquid crystal display according to claim 1, wherein an additional source line is partially connected to and extends along the at least one of the plurality of source lines.

8. The liquid crystal display according to claim 1, further comprising a bypass line connected to the at least one of the plurality of source lines at one of the plurality of intersection portions.

9. The liquid crystal display according to claim 1, wherein the at least one loop is arranged to overlap with at least one opening portion defined in one of the plurality of gate lines, the at least one opening portion defined in the one of the plurality of gate lines does not contain at least one of an electrode layer and a semiconductor layer.

10. The liquid crystal display according to claim 9, wherein the electrode layer defines a pixel electrode.

11. The liquid crystal display according to claim 9, wherein the at least one portion of the source electrode projects in the first direction from the at least one loop to an end point located beyond and outside of the at least one opening portion defined in the one of the plurality of gate lines.

12. The liquid crystal display according to claim 9, wherein the at least one portion of the source electrode projects in the first direction from the at least one loop to an end point of the at least one opening portion defined in the one of the plurality of gate lines.

13. The liquid crystal display according to claim 1, wherein the at least one portion of the source electrode projects in the first direction from the at least one loop to a location where a drain electrode is located.

14. The liquid crystal display according to claim 9, wherein the at least one opening portion defined in the one of the plurality of gate lines extends in the first direction from the at least one portion of the at least one of the plurality of source lines along the at least one of the plurality of gate lines.

15. The liquid crystal display according to claim 9, wherein the at least one portion of the at least one of the plurality of source lines extends through an approximate center of the at least one opening portion defined in the one of the plurality of gate lines.

16. The liquid crystal display according to claim 9, wherein the at least one opening portion defined in the one of the plurality of gate lines is surrounded by an edge of the one of the plurality of gate lines.

17. The liquid crystal display according to claim 1, further comprising a drain electrode and a storage capacitor electrode connected to each other.

18. The liquid crystal display according to claim 17, wherein the storage capacitor electrode is provided on a segment that protrudes from an auxiliary capacitance line.

19. The liquid crystal display according to claim 1, further comprising a gate electrode extending from the at least one of the plurality of gate lines, wherein the gate electrode and a portion of the at least one loop overlap each other.

20. The liquid crystal display according to claim 1, further comprising a gate electrode extending from the at least one of the plurality of gate lines, wherein the gate electrode and a portion of the source electrode overlap each other.

* * * * *